US 8,973,488 B2

(12) United States Patent
Larzul et al.

(10) Patent No.: US 8,973,488 B2
(45) Date of Patent: *Mar. 10, 2015

(54) CARTRIDGE EXTRACTION DEVICE (75) Inventors: David Larzul, Meyzieu (FR); Patrick Baudet, Meyzieu (FR); Alain Jaccard, Ste-Croix (CH); Blaise Rithener, La Tour-de-Peilu (CH)

(73) Assignee: Nestec S.A., Vevey (CH)

( * ) Notice: Subject to any disclaimer, the term of this patent is extended or adjusted under 35 U.S.C. 154(b) by 350 days.

This patent is subject to a terminal disclaimer.

(21) Appl. No.: 13/500,392

(22) PCT Filed: Oct. 5, 2010

(86) PCT No.: PCT/EP2010/064772
§ 371 (c)(1),
(2), (4) Date: Apr. 5, 2012

(87) PCT Pub. No.: WO2011/042400
PCT Pub. Date: Apr. 14, 2011

(65) Prior Publication Data
US 2012/0199007 A1 Aug. 9, 2012

(30) Foreign Application Priority Data

Oct. 5, 2009 (EP) .................................. 09172187

(51) Int. Cl.
*A47J 31/40* (2006.01)
*A47J 31/36* (2006.01)
(52) U.S. Cl.
CPC .......... *A47J 31/3633* (2013.01); *A47J 31/3695* (2013.01); *A47J 31/3623* (2013.01)
USPC ............................ 99/295; 99/302 P; 99/302 R
(58) Field of Classification Search
CPC .............. A47J 31/3623; A47J 31/3614; A47J 31/3633; A47J 31/3638; A47J 31/3647; A47J 31/3666; A47J 31/3676; A47J 31/3695

USPC ....................................... 99/302 P, 295, 302 R
See application file for complete search history.

(56) References Cited

U.S. PATENT DOCUMENTS 3,269,298 A * 8/1966 Grundmann ................ 99/289 R
(Continued)

FOREIGN PATENT DOCUMENTS

EP 1219217 7/2002
(Continued)

OTHER PUBLICATIONS

Written Opinion and International Search Report mailed Apr. 15, 2011 for corresponding Intl. Appln. No. PCT/EP2010/064772.

*Primary Examiner* — Reginald L Alexander
(74) *Attorney, Agent, or Firm* — K&L Gates LLP (57) ABSTRACT

A device (1) for receiving an ingredient cartridge (2) and extracting the ingredient by passing heated liquid through the cartridge, has a cartridge seat (10) and a liquid injection arrangement (50, 60, 61, 70, 80, 81) for injecting heated liquid into the cartridge seat. The cartridge seat comprises a first cartridge support (20) and a second cartridge support (30) facing the first support. The first and second cartridge supports are arranged to be movable relative to one another from an open position for insertion or removal of a cartridge into the seat to a closed position for passing heated liquid through such a cartridge. At least one support (20) of the cartridge supports (20, 30) is hydraulically actuatable and movable into the closed position by the liquid injection arrangement. The liquid injection arrangement is configured to: pressurize and circulate unheated liquid to the at least one support (20) for actuating and moving said at least one support (20) by the circulating unheated pressurized liquid; and guide this circulating unheated pressurized liquid under pressure from the at least one support (20) via a heater (70) into the cartridge seat (10) for extracting the ingredient contained in the cartridge (2).

18 Claims, 3 Drawing Sheets (56) References Cited

U.S. PATENT DOCUMENTS

| | | | | |
|---|---|---|---|---|
| 5,103,716 | A | * | 4/1992 | Mikkelsen ............... 99/289 R |
| 6,510,783 | B1 | * | 1/2003 | Basile et al. ............ 99/289 R |
| 6,763,759 | B2 | * | 7/2004 | Denisart ................. 99/302 P |
| 8,047,127 | B2 | * | 11/2011 | Lin ........................ 99/302 P |
| 2006/0196362 | A1 | | 9/2006 | Mariller |

FOREIGN PATENT DOCUMENTS

| | | |
|---|---|---|
| EP | 1247480 A1 | 10/2002 |
| EP | 1480540 | 4/2008 |
| WO | 00/49926 A1 | 8/2000 |
| WO | 03/073897 A1 | 9/2003 |
| WO | 2007135136 | 11/2007 |
| WO | 2008037642 | 4/2008 |

* cited by examiner

CARTRIDGE EXTRACTION DEVICE

FIELD OF THE INVENTION

The present invention relates to a cartridge extraction device with a cartridge seat formed by two facing cartridge supports that are hydraulically movable together and movable apart for inserting, extracting and evacuating cartridges. The extraction device may in particular be used in beverage preparation machines.

For the purpose of the present description, a "beverage" is meant to include any liquid food, such as tea, coffee, hot or cold chocolate, milk, soup, baby food, etc. . . . . Cartridges designate any enclosure for containing a pre-portioned ingredient whether rigid, such as capsules, or soft or flexible, such as pods, and made of any material, recyclable or non recyclable, biodegradable or non-biodegradable, such as aluminium or plastic, in particular aluminium pods or aluminium capsules.

BACKGROUND ART

One problem encountered with the handling of ingredient cartridges is the positioning of the cartridges in an extraction device and the closing of the latter around the cartridge to perform the extraction process. The cartridge usually has to be positioned by the user on a cartridge support or in a housing, then the device is closed manually or automatically around the cartridge.

It is important to correctly position the cartridge so that the device closes properly around the latter and to form a good seal to ensure good conditions of extraction. Bad positioning may damage the cartridge, and thus affect the conditions of extraction.

For the sealing of the device around the cartridge to permit proper extraction by passing a pressurized liquid through the cartridge without undesired leakage, the closing of the device around the cartridge must be carried out with a high level of precision. The closing distance of the mechanical closing arrangements of such devices are usually manually adjusted during the manufacturing process of the device to achieve the required level of precision.

The loading of the capsule must also be easy, without trial and error as to the correct position of the capsule in the device. The loading must also be as rapid as possible and not require excessive manipulations.

WO 2005/004683 relates to a capsule brewing device comprising: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position said capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The pod is passed through the external housing to the infusion chamber via a rigid pod feed channel and then the pod is transferred into the infusion chamber by an external bushing on the movable rear part of the brewing unit which is provided with a cam-like path for moving the rear part. This arrangement involves several problems. The pod must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the pod, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626 and WO 2007/135136.

To avoid the problem relating to precise mechanical closing of the extraction device around an ingredient cartridge, it is known to provide a hydraulic closure system in which the heated water used for extracting an ingredient in a cartridge is also used to actuate a hydraulic closure mechanism. In this case, the closing distance does not require special adjustment since the hydraulic closing force urges the cartridge supports of the extraction device together around the cartridge. An example of such a system is for instance disclosed in WO 2008/037642. Various systems have been developed along this idea, as for instance discussed in EP 1 219 217, EP 1 480 540, EP 1 776 026, EP 1 912 542, WO 2005/115206, and WO 2006/005736.

A problem with using heated water to actuate the closure mechanism lies in the risk of scale deposition from the heated water in the hydraulic mechanism.

It has been proposed in EP 1 545 278 to implement two parallel water lines connected to a single water source and both controlled by a common multi-way valve. One water circulation circuit passes via a heater into the extraction device and the other water line, unheated, is used for the hydraulic closure of the extraction device. In a first step, the multi-way valve permits supply of pressurized water to the hydraulic closure system of the extraction device. Once the extraction device is closed, the pressure built up in the hydraulic closure system by the presence of the pressurized static, forces the circulation of water in the second line through a check valve into the extraction device via the heater. Once extraction is over the common multi-way valve is moved into a position to connect the hydraulic closure system with a purging circuit to evacuate the pressurized water that had been statically captured in the hydraulic water circuit during extraction.

One problem with this solution lies in the complication of the parallel water circuits for the hydraulic closure and for the hot injection and the multi-way control valve associated therewith.

SUMMARY OF THE INVENTION

One aspect of the present invention relates to a device for receiving an ingredient cartridge and extracting the ingredient by passing heated liquid through the cartridge. The device has a cartridge seat and a liquid injection arrangement for injecting heated liquid into the cartridge seat. The cartridge seat comprises a first cartridge support and a second cartridge support facing the first support. The first and second cartridge supports are arranged to be movable relative to one another from an open position—for insertion or removal of a cartridge into the seat—to a closed position—for passing heated liquid through such a cartridge. At least one support of the cartridge supports is hydraulically actuatable and movable into the closed position by the liquid injection arrangement.

Typically, this device is comprised in a beverage preparation machine for receiving ingredient cartridges such as capsules and/or pods. For instance, the machine is a coffee, tea, chocolate or soup preparation machine. In particular, the machine is arranged for preparing within the cartridge seat a beverage by passing hot water or another liquid through a cartridge containing an ingredient of the beverage to be prepared, such as ground coffee or tea or chocolate or cacao or milk powder.

For example, the preparation machine comprises: a beverage preparation unit arranged to receive cartridges for use and evacuate cartridges upon use, e.g. an extraction device; a housing having an opening leading into an area to which cartridges are evacuated from the preparation unit; and a receptacle having a cavity forming a storage space for collecting cartridges evacuated to such an area into the receptacle to a level of fill. The receptacle is insertable into the area for collecting used cartridges and is removable from this area for emptying the collected cartridges. Examples of such machines are disclosed in WO 2009/074550 and in PCT/EP09/053368.

In accordance with the invention, the liquid injection arrangement is configured to: pressurise and circulate unheated liquid to the at least one support for actuating and moving the at least one support by the circulating unheated pressurised liquid; and guide the circulating unheated pressurised liquid under pressure from the at least one support via a heater into the cartridge seat for extracting the ingredient.

Typically, the hydraulically actuatable and movable support has a linear displacement configuration. The hydraulically actuatable and movable support may be associated with an expansion chamber through which the pressurised liquid is circulated for expanding the chamber and displacing the hydraulic support.

In one embodiment, this hydraulically movable cartridge support comprises a hydraulic piston, such as a piston movable in a piston chamber, the liquid injection arrangement being connected to the piston chamber for injecting pressurised liquid into the chamber and driving hydraulically the support with the piston against the facing support into the closed position, the liquid injection arrangement being configured to inject unheated pressurised liquid into the piston chamber and to guide via a heater this liquid under pressure from the piston chamber into the cartridge seat. For instance, the piston chamber has an inlet and an outlet for circulating pressurised liquid through the piston chamber while the cartridge supports is in the closed position.

Thus, the liquid is circulated under pressure from the entry of the piston chamber into the cartridge seat, the liquid being unheated as it enters the piston chamber, heated upon leaving the piston chamber and circulated upon heating into the cartridge seat. The liquid circulation used for pressurizing the piston chamber during an extraction cycle is the same liquid circulation that is used for extracting the ingredient of the cartridge during the same extraction cycle. There is a single liquid circulation arrangement for hydraulically closing the cartridge seat and maintaining it in a closed state, and for extracting the ingredient of the cartridge. Yet, hydraulic closure and maintaining the seat in a closed state are carried out with unheated circulating liquid whereas extraction is achieved with the liquid upon heating.

The piston chamber typically has an inlet and an outlet for circulating pressurised liquid through the piston chamber while the cartridge supports are in the closed position.

It is of course possible to have each cartridge supports of the device hydraulically actuatable and movable, in particular by being associated with its own hydraulic piston and piston chamber. In this case, the fluid injection arrangement may be configured to circulate under pressure liquid from one piston chamber to the other piston chamber and then circulate the liquid still under pressure through a heater and then into the cartridge seat.

Hence, the liquid that is pressurised to actuate the hydraulic closure mechanism, i.e. the piston moving in the piston chamber, circulates under pressure from the inlet to the outlet of the piston chamber and continues to circulate still under pressure from the piston chamber to the cartridge seat via a heater during the entire extraction process. In other words, there is a continuous pressurised circulation path of the liquid through the piston chamber, the heater and into the cartridge seat. However, the liquid circulates unheated through the piston chamber, which inhibits scale deposition therein, and is heated still under pressure thereafter in the heater to be then injected upon heating and still under pressure into the cartridge seat.

The piston chamber may have an outlet connected to an inlet of the cartridge seat by a duct associated with an in-line heater for heating liquid circulated under pressure from the piston chamber to the cartridge seat and injected upon heating into the cartridge seat.

The injection arrangement can be configured to circulate unheated pressurised liquid from the hydraulic support via a valve into the cartridge seat (10), which valve is configured for building up a controlled pressure in the unheated circulating liquid that actuates and moves the hydraulic support.

In particular, the injection arrangement may have a valve between the an outlet of the piston chamber and an inlet of the cartridge seat for building up a controlled pressure in the liquid circulating under pressure through the piston chamber.

Such a valve may also act as an anti-return valve to avoid the return of any liquid from the cartridge seat. In a less preferred embodiment, it is also possible to omit this valve and use the ingredient cartridge properly positioned against the liquid inlet of the cartridge seat to build up the pressure in the liquid for actuating the hydraulic support.

Typically, the device is associated with a pump for pressurising and circulating liquid under pressure into the cartridge seat via the hydraulic support, e.g. through the piston chamber, and the heater. Normally, such a pump, e.g. a reciprocating piston pump which is known in the art of beverage preparation machines, would be located upstream the hydraulic support.

At least one of the cartridge supports may be movable towards and away from the facing cartridge support by a mechanical drive arrangement. The mechanical drive arrangement may include a force transmission lever, in particular a knuckle arrangement, and/or a force transmission gear arrangement, in particular a spur gear arrangement. The mechanical drive arrangement can be actuated by a hand-drivable handle and/or by a motor, in particular an electric motor.

Typically, the mechanical drive arrangement is configured to move the cartridge supports together over a predominant portion of the closing distance, e.g. over 80%, 90% or 95% of the closing distance, and use the hydraulic closure for the tight sealing of the two cartridge supports together. Hence, the tight sealing is not achieved by controlling the end of the closure distance but by acting on the closure pressure in the piston chamber. It follows that tolerance issues on the closing distance of the cartridge seat and manual fine adjustment thereof can be avoided. For instance, the hydraulic closing distance is in the range of 0.05 to 2 mm, in particular 0.1 to 1 mm, such as 0.2 to 0.7 mm. This contrasts significantly with purely mechanical closure systems (non hydraulic) that must be adjusted with high tolerances, usually by hand, during the assembly process.

In one embodiment, one of these first and second cartridge supports is movable by the mechanical drive arrangement to and away from the facing cartridge support, which facing cartridge support is hydraulically actuatable and movable, e.g. comprises a piston movable in the piston chamber.

In another embodiment, the cartridge support that is hydraulically actuatable and movable, e.g. that comprises a piston movable in the piston chamber, is further movable by the mechanical drive arrangement.

The liquid injection arrangement may be configured to inject heated liquid into the cartridge seat through a liquid inlet of the seat, which inlet is located in the hydraulically actuatable and movable cartridge support, e.g. having a piston movable in the piston chamber. In other words, the same cartridge support of the seat can be associated with the unheated water circulation and with the heated water circulation. Hence, the upstream fluid circulation arrangement leading into the cartridge seat may be maintained in association with one cartridge support only, i.e. it does not have to extend over with both supports which reduces the length of the connection ducts. Moreover, this can be a significant advantage when the piston chamber is maintained fixed in the extraction device since flexible liquid circulation ducts, which are difficult to assemble in an automatic assembly process, can be minimised or even avoided.

The liquid injection arrangement can be configured to inject heated liquid into the cartridge seat through a liquid inlet of the seat that is located in one of the cartridge supports, the facing cartridge support having an outlet for dispensing liquid upon extraction of the ingredient of the cartridge.

The heater is advantageously associated with a temperature regulating arrangement. The temperature sensing arrangement may comprise at least one temperature sensor selected from temperature sensors that are located: upstream the piston chamber; in and/or adjacent the piston chamber; between the piston chamber and the heater; in the heater; between the heater and the cartridge seat; and in and/or adjacent the cartridge seat.

In one embodiment, the temperature regulating arrangement includes a temperature sensor at the liquid outlet of the heater. The temperature sensor(s) is/are preferably connected to an electric control circuit of the heater in particular for a loop regulation of the heater.

For example, the system has a first sensor for sensing the temperature of the liquid between the piston chamber and the heater and a second sensor of sensing the temperature between the heater and the cartridge seat. These two sensors are used to control the powering of the heater to adjust the temperature of the water exiting the heater.

The invention also relates to a system that comprises an ingredient cartridge and a device as described above, the ingredient cartridge being held in the cartridge seat of said device.

In the context of the above description, "heated liquid" means liquid that has been directly heated by the heater of the extraction device. "Unheated liquid" means liquid that has in particular not as yet exited the piston chamber and passed through the heater. Thus, the designation of "unheated liquid" includes the liquid from the source of liquid, e.g. a tank, upstream the piston chamber and inside the piston chamber and generally upstream the heater.

Further features and advantages of the invention will appear in the description of the detailed description.

BRIEF DESCRIPTION OF THE DRAWINGS

The invention will now be described with reference to the schematic drawings, wherein.

DETAILED DESCRIPTION

The invention is now described with reference to the particular embodiment illustrated in FIGS. 1a to 3.

These Figures show an extraction device 1 of a machine for preparing beverages by circulating heated liquid, such as water, through an ingredient cartridge 2 in the form of a soft pod, e.g. made of a sealed and air-tight aluminium envelope containing the beverage ingredient e.g. ground coffee, as for example commercialised by NESPRESSO™.

Extraction device 1 has a cartridge seat 10 comprising a first cartridge support 20 and a second cartridge support 30 facing first cartridge support 20 arranged to receive cartridge 2 in an open spaced apart configuration and to enclose cartridge 2 in a closed urged together extraction configuration. FIGS. 1a, 1b, 1c and 2b illustrate cartridge seat 10 with cartridge supports 20,30 in their open spaced apart configuration. FIGS. 2a and 3 show cartridge seat 10 with cartridge supports 20,30 in their closed urged together extraction configuration in which cartridge 2 is enclosed in seat 10.

Figure 1A:
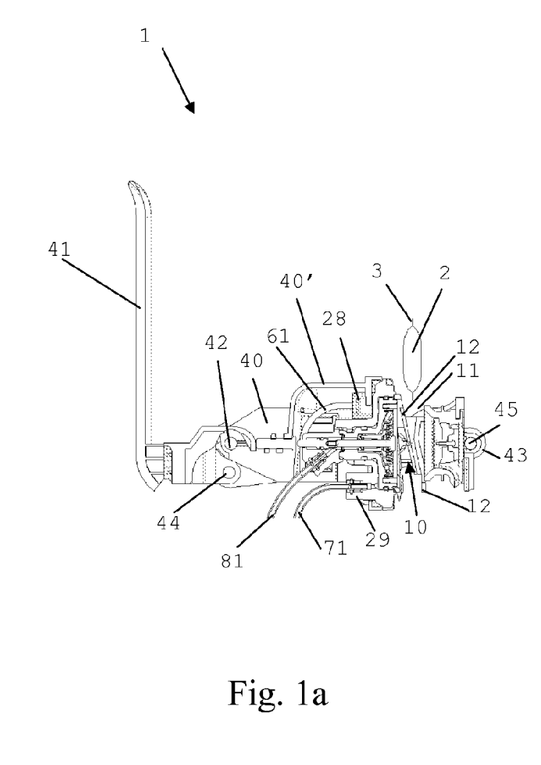
FIGS. 1a to 1c show cross-sectional views of part of the beverage extraction device according to the invention, the device being in an open configuration.
Figure 2A:
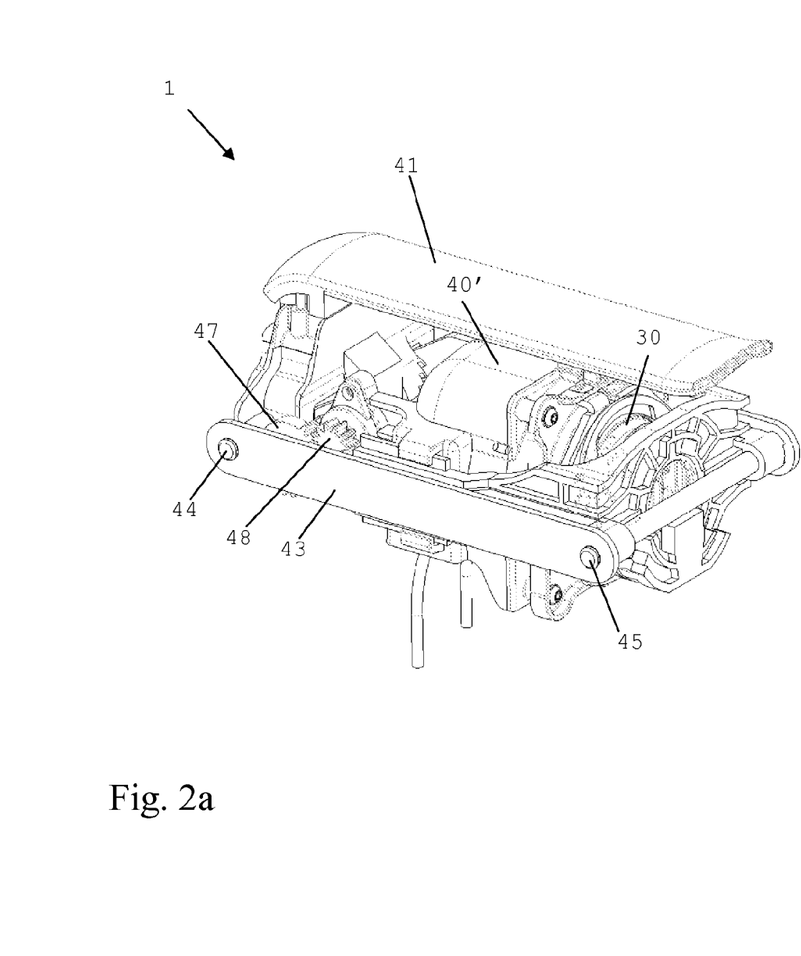
FIGS. 2a and 2b show perspective views of part of the same beverage extraction device in a closed and open configuration, respectively.

FIG. 1a illustrates the insertion by gravity of cartridge 2 from above into cartridge seat 10. More specifically cartridge 2 is shown above a cartridge inlet channel 11 that leads to seat 10 underneath.

Figure 1B:
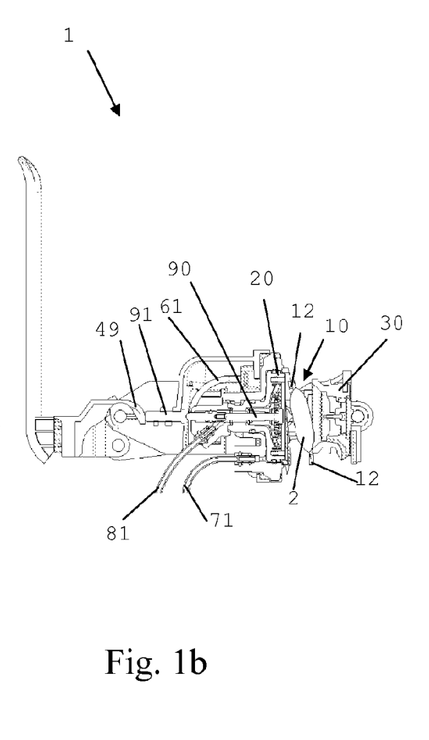

In FIG. 1b, cartridge 2 is shown held in cartridge seat 10 in an open position prior to extraction. Cartridge seat 10 is associated with cartridge retaining members 12 for holding cartridge 2 in seat 10 while support members 20,30 are in their spaced apart open position. More specifically, retaining members 12 are arranged at the periphery of seat 10 so that rim 3 of cartridge 2 rests on and against members 12 in this intermediate cartridge loading position. When support members 20,30 are urged together, cartridge 2 with rim 3 is pushed by support member 30 through peripheral member 12 against facing member 20 into the cartridge extraction position in which cartridge 2 is enclosed in-between support members 20,30 (as shown in FIG. 3).

Figure 1C:
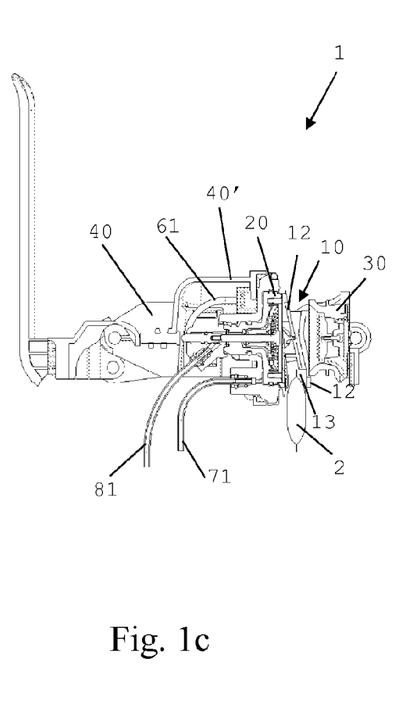

In FIG. 1c, cartridge seat 10 is shown in its reopened position upon extraction with support members 20,30 in their spaced apart configuration. Device 1 is arranged to evacuate used cartridge 2 by gravity from seat 10 via a lower evacuation passage 13. Cartridge 2 may be collected in a cartridge collector (not shown) located underneath seat 10.

The general principle of the extraction device with the retaining members relating to the insertion, intermediate positioning, enclosing and evacuation of cartridge 2 is disclosed in greater details in EP 1 859 714, in particular for soft or flexible cartridges, e.g. pods, as well as in EP 1 646 305, in particular for rigid cartridges, e.g. capsules. These publications are hereby incorporated by way of reference.

In FIGS. 2a and 3 support members 20,30 are shown urged together enclosing cartridge 2 in seat 10.

As shown in greater details in FIG. 3, hydraulic cartridge support 20 has a tubular piston 21 movable in a piston chamber 25. Piston chamber 25 is delimited by an outer generally cup-shaped front part 26 holding the front part of capsule support member 20 and by a generally tubular rear part 27 inside and along which piston 21 is movable.

Moreover, extraction device 1 is associated with a liquid injection arrangement that includes: a source of liquid, such as cold water in particular stored in a reservoir 50, a pump 60 for pumping liquid from reservoir 50 via a pipe 61 and chamber inlet 28 under pressure into piston chamber 25 and then still under pressure via chamber outlet 29 into inline heater 70 via tube 71 and then, from heater 70 via check valve 80, tube 81 into piston tube 21 forming a heated liquid inlet of cartridge seat 10.

In cartridge seat 10, the pressurised and heated liquid flows through cartridge 2 to form a beverage by extraction of the ingredient contained in cartridge 2, the beverage being collected and dispensed via outlet 35 associated with cartridge support 30.

For the sake of clarity, the liquid flow path through extraction device 1 is schematically indicated by the thick arrows in FIG. 3.

Hence, this liquid injection arrangement is connected to the piston chamber 25 for injecting unheated pressurised liquid into chamber 25 and driving hydraulically cartridge support 20 with piston 21 against facing cartridge support 30 into the closed position. Seals 22,23, e.g. o-ring seals, between cartridge support 20,21 and front and rear parts 26,26 prevent leakage from chamber 25. Upon circulation through piston chamber 25, the liquid is further circulated continuously under pressure from piston chamber 25, through heater 70 into cartridge chamber 10, in accordance with the invention.

Moreover, cartridge support 30 is movable towards and away from facing cartridge support 20 by a mechanical drive arrangement.

Figure 2B:
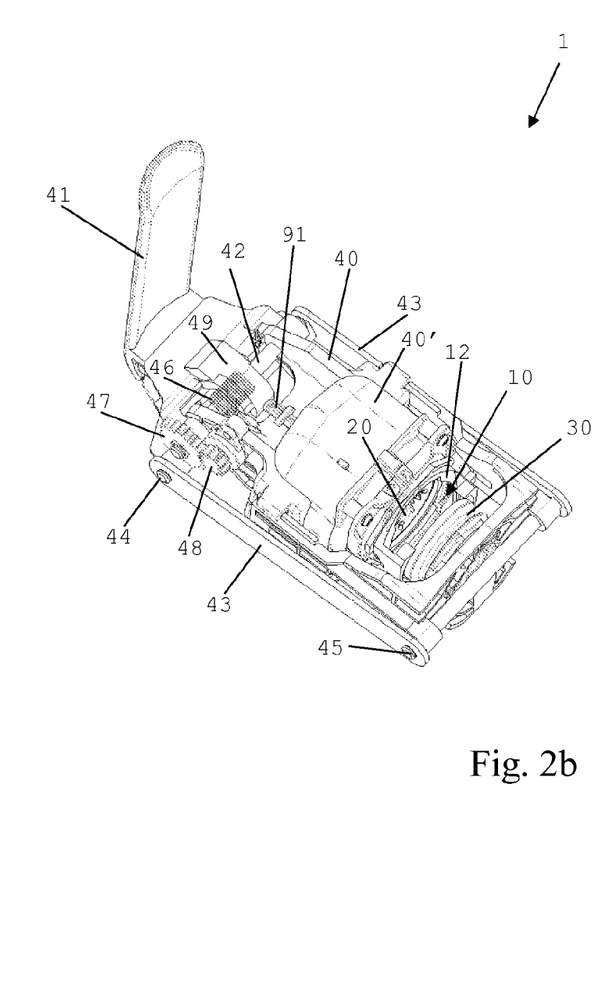
Figure 3:
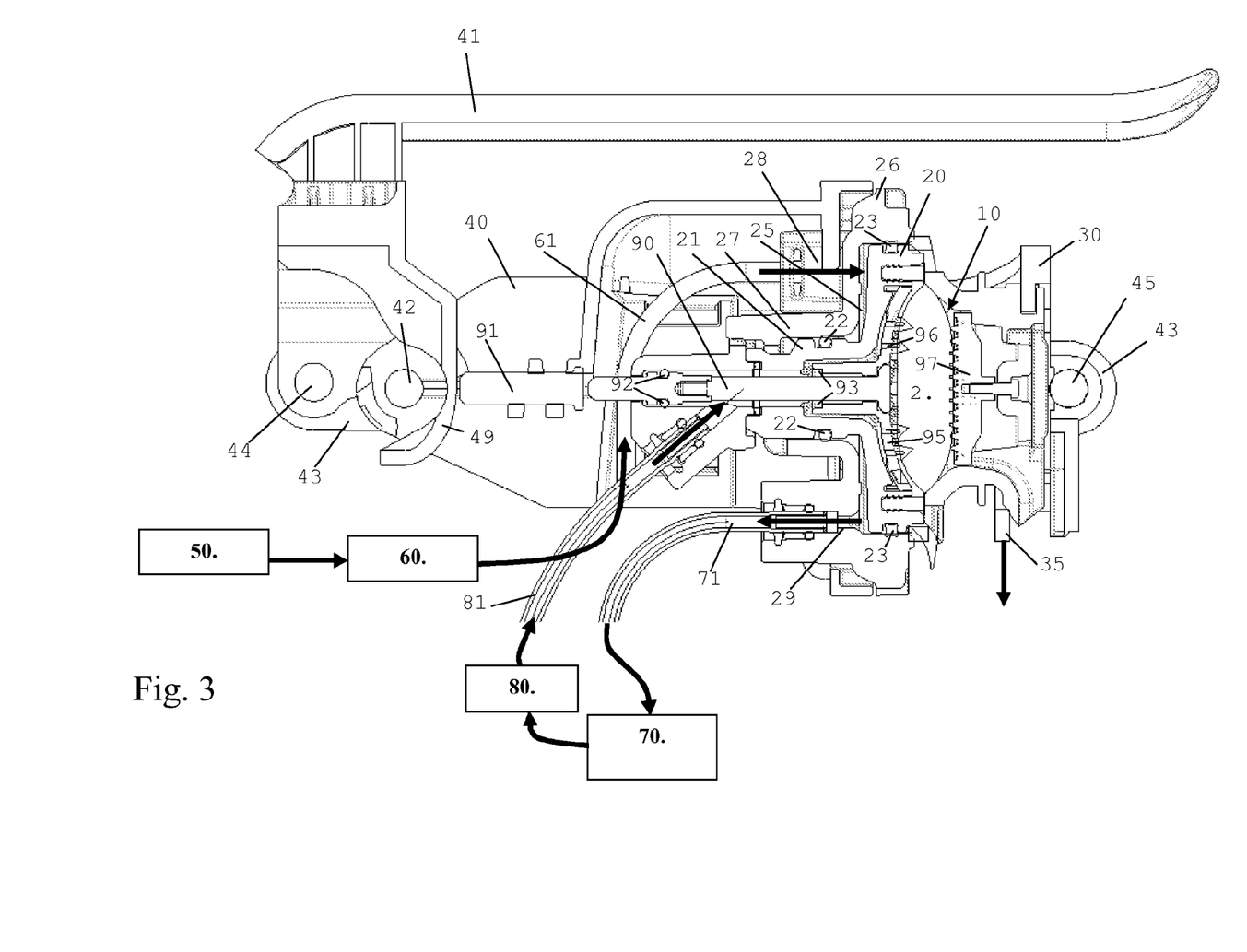
FIG. 3 shows a cross-sectional and partly schematic view of the beverage extraction device of FIGS. 1a to 2b in the closed configuration.

As shown in greater details in FIGS. 2a and 2b, the mechanical drive arrangement comprise a hand-drivable handle 41 pivotally mounted on a fixed frame 40 via an axis 42 of handle 41. A pair of cranks 43 are at one extremity 44 rotatably mounted on handle 41 at a distance from axis 42 and at their other extremity 45 pivotally mounted to cartridge support 30, so that when handle 41 is pushed from the open position (FIG. 2b) into the closed position (FIG. 2a), cranks 43 are driven by handle 41 pivoting about axis 42 to pull cartridge support 30 towards cartridge support 20. Various mechanical drive arrangements, manually actuated or motorised, may be used to implement this optional aspect of the invention, for instance as disclosed in EP 1 646 305, EP 1 859 713, EP 1 767 129 and WO 2009/043630 which are hereby incorporated by reference.

Frame 40 also bears a housing panel 40' for shielding tube 61, inlet connection 28 and front and rear parts 26,27 delimiting piston chamber 25. Front and rear parts 26,27 are also fixed to frame 40. Hence, tubes 61,71 can be mounted between fixed elements 26,60,70,80 and may be made of rigid materials that can be easily handled in an automatic manufacturing process of the extraction device.

Furthermore, to facilitate reopening of handle 41, a spring element is provided that is stressed during the closing movement and that drives handle 41 back automatically in the opening movement. In particular, a helicoidal spring 46 has one end secured to frame 40 and another end secured to axis 42. Helicoidal spring 46 is mounted around axis 42. Different spring arrangements may of course be provided to produce this or a similar effect. Moreover, to provide an ergonomic feel of control of the mechanical drive arrangement during the opening and closing movement via handle 41 in order to improve the comfort for the user when actuating handle 41, a movement dampener is provided. In this particular example, the dampener is provided in the form of spur gears that follow the rotation of axis 42. Hence, a first toothed wheel 47 is assembled to axis 42 and a second toothed wheel 48 cooperating with first wheel 42 is rotatably mounted on frame 40 to dampen the rotation of axis 42.

It is of course possible to mount the spring in the opposite direction, i.e. to assist the closure movement of the extraction device.

Extraction device 1 is also provided with a cartridge ejector 90 for ejecting cartridge 2 at reopening upon extraction so as to assist evacuation of cartridge 2. Ejector rod 90 is movable within tubular piston 21 and actuated via cam 49 and cam-follower 91 by the movement of handle 41 to which cam 49 is connected. In FIG. 3, ejector 90 is shown in its retracted position whereas in FIG. 1b, ejector 90 is shown in its deployed position to eject cartridge 2 from cartridge support 20.

Also shown in FIG. 3, cartridge support 20 is fitted with a sprinkler 95 for injecting heated liquid into cartridge 2 via hollow needles 96 for piercing cartridge 2. During use, heated liquid is delivered under pressure from tube 81 into tubular piston 21 around to circulate around ejector 91 along sprinkler 95 and into cartridge 2 via needles 96. Seals 92,93, e.g. o-ring seals, are provided to prevent leakage along ejector 90 of the injected water. Facing cartridge support 30 bears an opening arrangement 97, e.g. in the form of a plate with tearing elements such as a pyramid plate. Hence, heated fluid injected into cartridge 2 via needles 96 extract the ingredient contained in the cartridge and leaves cartridge 2 at opening arrangement 97 from where it is circulated to dispensing outlet 35. A cup or mug can then be used to collect the beverage dispensed at outlet 35 that is connected to cartridge support 30. Upon extraction, ejector 90 is particularly helpful to detach cartridge 2 from needles 96.

Upon introducing a cartridge 2 into open seat 10 (FIG. 1b), the user moves down handle 41, whereby the front part of extraction device 1, i.e. cartridge support 30, is driven in translation by crank 43 and lever mechanism placed on both side of extraction device 1. Thereby, cartridge 2 is forced beyond retaining members 12 by bending peripheral flanges 3 of cartridge 2. Once the mechanical closing movement via handle 41 is over, cartridge 2 is caught between pyramid plate 97 and sprinkler 95, pierced by needles 96. At this stage, a near sealing of cartridge seat 10 around cartridge 2 is achieved. In this almost closed configuration, cartridge supports 20,30 are typically spaced apart by less than 2.5 mm usually less than 1.5 mm, such as less than 0.5 mm.

In a variation, it is also possible to configure the closing distance such that piercing of the cartridge occurs under the effect of the hydraulic closure of the cartridge seat instead of under the mechanical closure. This offers the advantage that the user does not have to provide the increased closure force for piercing the cartridge. This closure force is then provided by the pump.

Handle 41 may be so arranged in frame 40 so that when handle 41 reaches the horizontal position, a feeling of locking is given to users so as to provide the user an ergonomic feed-back of the end of the movement.

Once pump 60 is activated to prepare a beverage, unheated liquid, e.g. cold water, is sent to piston chamber 25. Then the liquid leaves piston chamber 25 and flows through heating element 70 and thereafter until valve 80. When the pressure in the fluid starts to increase in front of valve 80, cartridge support 20 with piston 21 is translated and urged under the increasing pressure of the liquid in piston chamber 25 against facing cartridge support 30 to properly seal cartridge 2 within cartridge seat 10. Opening of valve 80 occurs at a pressure level sufficient to avoid any leakage between capsule supports 20,30, as illustrated in FIG. 3.

When valve 80 opens to allow the passage of the fluid, pressurized heated liquid flows to sprinkler 95 and into cartridge 2 via needles 96, whereby the pressure increases in cartridge 2 until the cartridge is torn open on pyramid plate 97 to allow the liquid to flow out of cartridge 2 during extraction.

At the end of the brewing, valve 80 can be deactivated so as to release the pressure in piston chamber 25. Hence, cartridge supports 20,30 are unsealed and allowed to separate. Typically, valve 80, which may be a solenoid valve, is deactivated with the deactivation of pump 60.

To evacuate capsule 2 upon use, the user releases handle 41 which opens automatically under the effect of spring 46 at a controlled speed under the effect of dampener 47,48.

Thereby, the front part of extraction device 1, i.e. cartridge support 30, is driven away from the rear part of extraction device 1, i.e. cartridge support 20. This leads to further opening cartridge seat 10 while ejector 90 is deployed under the effect of cam 49 and cam follower 91 to push cartridge 2 away from cartridge support 20 and allow it to fall under the effect of gravity from cartridge seat 10 (FIG. 1c), e.g. into a used capsule collector (not shown) located thereunder.

The invention claimed is:

1. A device for receiving an ingredient cartridge and extracting the ingredient by passing heated liquid through the cartridge, comprising:
    a cartridge seat and a liquid injection arrangement for injecting heated liquid into the cartridge seat;
    the cartridge seat comprising a first cartridge support and a second cartridge support facing the first support;
    the first and second cartridge supports being designed to be movable relative to one another from an open position for insertion or removal of a cartridge into the seat to a closed position for passing heated liquid through the cartridge;
    at least one of the cartridge supports being hydraulically actuatable and movable into the closed position by the liquid injection arrangement;
    the cartridge supports are movable towards and away from the facing cartridge support by a mechanical drive arrangement; and
    the liquid injection arrangement is configured to pressurize and circulate unheated liquid to the cartridge support for actuating and moving the cartridge support by the circulating unheated pressurised liquid, and guide the circulating unheated pressurized liquid under pressure from the support via a heater into the cartridge seat for extracting the ingredient.

2. The device of claim 1, wherein the hydraulically movable cartridge support comprises a hydraulic piston that is movable in a piston chamber, the liquid injection arrangement being connected to the piston chamber for injecting pressurized liquid into the chamber and hydraulically driving the support with the piston against the facing support into the closed position, the liquid injection arrangement being configured to inject unheated pressurized liquid into the piston chamber and to guide via a heater the liquid under pressure from the piston chamber into the cartridge seat, the piston chamber having an inlet and an outlet for circulating pressurized liquid through the piston chamber while the cartridge supports are in the closed position.

3. The device of claim 2, wherein the piston chamber has an outlet connected to an inlet of the cartridge seat by a duct associated with an in-line heater for heating liquid circulated under pressure from the piston chamber to the cartridge seat and injected upon heating into the cartridge seat.

4. The device of claim 1, wherein the liquid injection arrangement is designed to circulate unheated pressurised liquid from the cartridge support via a valve into the cartridge seat, the valve is designed to build up a controlled pressure in the unheated circulating liquid that actuates and moves the cartridge support.

5. The device of claim 1, comprising a pump for pressurizing and circulating the liquid.

6. The device of claim 1, wherein the mechanical drive arrangement comprises a force transmission lever.

7. The device of claim 6, wherein the mechanical drive arrangement is actuated by a hand-drivable handle.

8. The device of claim 6, wherein the mechanical drive arrangement is actuated by a motor.

9. The device of claim 1, wherein the first and second cartridge supports are movable by the mechanical drive arrangement to and away from the facing cartridge support that is hydraulically actuatable and movable.

10. The device of claim 1, wherein the hydraulically actuatable and movable cartridge support is movable by the mechanical drive arrangement.

11. The device of claim 1, wherein the liquid injection arrangement is designed to inject heated liquid into the cartridge seat through a liquid inlet of the seat that is located in the hydraulically actuatable and movable cartridge support.

12. The device of claim 1, wherein the liquid injection arrangement is designed to inject heated liquid into the cartridge seat through a liquid inlet in one of the cartridge supports, the facing cartridge support having an outlet for dispensing liquid upon extraction of said ingredient.

13. A device for receiving an ingredient cartridge and extracting the ingredient by passing heated liquid through the cartridge, comprising:

a cartridge seat and a liquid injection arrangement for injecting heated liquid into the cartridge seat, the cartridge seat comprising a first cartridge support and a second cartridge support facing the first support, the first and second cartridge supports designed to be movable relative to one another from an open position for insertion or removal of a cartridge into the seat to a closed position for passing heated liquid through the cartridge; and at least one of the cartridge supports being hydraulically actuatable and movable into the closed position by the liquid injection arrangement, the liquid injection arrangement configured to pressurize and circulate unheated liquid to the cartridge support for actuating and moving the cartridge support by the circulating unheated pressurized liquid, and guide the circulating unheated pressurized liquid under pressure from the support via a heater into the cartridge seat for extracting the ingredient, the cartridge supports being movable towards and away from the facing cartridge support by a mechanical drive arrangement.

14. The device of claim 13, wherein the mechanical drive arrangement comprises a force transmission lever.

15. The device of claim 14, wherein the mechanical drive arrangement is actuated by a hand-drivable handle.

16. The device of claim 14, wherein the mechanical drive arrangement is actuated by a motor.

17. The device of claim 13, wherein the first and second cartridge supports are movable by the mechanical drive arrangement to and away from the facing cartridge support that is hydraulically actuatable and movable.

18. The device of claim 13, wherein the hydraulically actuatable and movable cartridge support is movable by the mechanical drive arrangement.

\* \* \* \* \*